United States Patent
Fessel

(10) Patent No.: US 11,175,851 B2
(45) Date of Patent: Nov. 16, 2021

(54) METHOD AND SYSTEM FOR FAST, SECURE, AND COMPLETE CERTIFICATION OF MEMORY STATUS

(71) Applicant: Cigent Technology, Inc., Fort Myers, FL (US)

(72) Inventor: Tony Edward Fessel, Fort Myers, FL (US)

(73) Assignee: CIGNET TECHNOLOGY, INC., Fort Myers, FL (US)

( * ) Notice: Subject to any disclaimer, the term of this patent is extended or adjusted under 35 U.S.C. 154(b) by 111 days.

(21) Appl. No.: 16/684,858

(22) Filed: Nov. 15, 2019

(65) Prior Publication Data

US 2021/0149580 A1 May 20, 2021

(51) Int. Cl.
*G06F 3/06* (2006.01)
*G06F 16/28* (2019.01)

(52) U.S. Cl.
CPC .......... *G06F 3/0653* (2013.01); *G06F 3/0604* (2013.01); *G06F 3/0605* (2013.01); *G06F 3/0652* (2013.01); *G06F 3/0673* (2013.01); *G06F 16/285* (2019.01)

(58) Field of Classification Search
CPC .... G06F 3/0653; G06F 3/0605; G06F 3/0652; G06F 3/0673
See application file for complete search history.

(56) References Cited

U.S. PATENT DOCUMENTS

| | | | |
|---|---|---|---|
| 8,069,317 B2 * | 11/2011 | Boyd | |
| 2008/0313107 A1 | 12/2008 | Futatsugi | |
| 2009/0019244 A1 | 1/2009 | Maeda | |
| 2011/0072202 A1 | 3/2011 | Rousseau | |
| 2011/0145483 A1 * | 6/2011 | Sudo | |
| 2017/0052734 A1 * | 2/2017 | Kirchner | |
| 2017/0060451 A1 | 3/2017 | Hayes et al. | |
| 2018/0083854 A1 | 3/2018 | Munjal et al. | |

OTHER PUBLICATIONS

Notification of Transmittal of the International Search Report (Forms PCT/ISA/220 and PCT/ISA/210) and the Written Opinion of the International Searching Authority (Form PCT/ISA/237) dated Feb. 16, 2021, by the International Application Division Korean Intellectual Property Office in corresponding International Application No. PCT/US2020/057910. (10 pages).

\* cited by examiner

*Primary Examiner* — Tracy A Warren

(74) *Attorney, Agent, or Firm* — Buchanan Ingersoll & Rooney PC

(57) ABSTRACT

A method of verifying erasure of data from a data storage device, the method including retrieving a first metadata portion associated with a first block of data included in the plurality of blocks of data; determining, based on the retrieved first metadata portion, a current content classification associated with the first block of data and a current erasure state associated with the first block of data; and determining an erasure status associated with the first block of data based on the current content classification associated with the first block of data and the current erasure state associated with the first block of data.

32 Claims, 6 Drawing Sheets

300

| | Example Block Descriptor | | | | | | |
|---|---|---|---|---|---|---|---|
| | Block Content Classification | | | | | Block State | |
| Bit 7 | Bit 6 | Bit 5 | Bit 4 | Bit 3 | Bit 2 | Bit 1 | Bit 0 |
| unused | Unallocated | Firmware | User | unused | unused | Not Erased | Erased |

| Block Analysis | | |
|---|---|---|
| Block Content Classification | Block State | Status Acceptable? |
| Firmware | Erased | Yes |
| Firmware | Not Erased | Yes |
| User | Erased | Yes |
| User | Not Erased | No |
| Unallocated | Erased | Yes |
| Unallocated | Not Erased | No |

FIG. 4

METHOD AND SYSTEM FOR FAST, SECURE, AND COMPLETE CERTIFICATION OF MEMORY STATUS

FIELD

The present disclosure relates to verifying the erasure of data from a data storage device, and specifically to securely and accurately verifying that data was properly removed from a data storage device.

BACKGROUND

Data in a computing device can be extremely important and sensitive. There is widespread industry concern over the ability (or inability) to securely erase storage devices containing data. Currently, the industry standard method of verifying data erasure is to read all or a representative sample of the data through a user accessible interface, and then to check the returned information to determine whether it contains user generated data. There are several shortcomings, however, with the current verification paradigm.

One shortcoming of the current verification paradigm results from using a user accessible interface to verify the information on a storage device. These user accessible interfaces are designed to only return data with which the user can directly interact. For example, during the life of a storage device, certain areas of the drive that may contain user data are made inaccessible to the user. This can be related to overprovisioning for the sake of wear leveling, failed block remapping, on-disk firmware storage, or other internal device functions that prevent user access. Therefore, these conventional verification paradigms will not be able to access these other types of data.

Another shortcoming of the current verification paradigm is the lack of speed. As storage devices increase in capacity, so does the time it takes to read back all the data needed to verify the erasure of the data storage device. The larger the device, the longer the verification takes. This issue has led to sampling type verification algorithms that eschew full verifications for the sake of saving time. This results in an incomplete and unreliable verification results.

Another short coming of the current verification paradigm is the lack of data security. Using current techniques, the entity tasked with verifying the erasure is required to be able to access any of the data stored on the storage device. In this case, if any data is left on the storage device, then there exists the possibility that an unauthorized entity will be able to access the data (i.e., sensitive data) on the storage device for any purpose.

Thus, there is a need for a solution that enables for verification of the erasure of data from a data storage device while minimizing security concerns over unauthorized data access.

SUMMARY

The present disclosure provides a description of systems and method to securely and accurately verify that data was properly removed from a data storage device. The present disclosure addresses the drawbacks of conventional techniques by providing a fast, secure, and complete verification interface that validates, via analysis of metadata, any and all storage areas on a storage device without transferring the data (i.e., sensitive data, user data, etc.) itself through the interface, depending on implementation. The present disclosure provides a way to verify non-user blocks of data as well, such as firmware and unallocated blocks of data in a storage device. In contrast, conventional verification methods would not be able to provide this level of verification of the current disclosure because firmware and unallocated blocks of data are inaccessible through conventional interfaces.

A method for verifying erasure of data from a data storage device, wherein the data stored in the data storage device comprises a plurality of blocks of data, where the data stored in the data storage device comprises a metadata portion describing (1) a content classification based on current content associated with a respective block of data and (2) an erasure state associated with the respective block of data, the method includes: retrieving, by a verification interface of a computing device, a first metadata portion associated with a first block of data included in the plurality of blocks of data; determining, by the verification interface of the computing device and based on the retrieved first metadata portion, a current content classification associated with the first block of data, wherein the determined current content classification is one of plurality of types of content classification including at least a first type of content classification and a second type of content classification; determining, by the verification interface of the computing device and based on the retrieved first metadata portion, a current erasure state associated with the first block of data, wherein the determined current erasure state is one of a plurality of types of erasure states including at least a first type of erasure state and a second type of erasure state; and determining, by the verification interface of the computing device, an erasure status associated with the first block of data based on the current content classification associated with the first block of data and the current erasure state associated with the first block of data.

A system for verifying erasure of data from a data storage device, where the data stored in the data storage device comprises a plurality of blocks of data, where the data stored in the data storage device comprises a metadata portion describing (1) a content classification based on current content associated with a respective block of data and (2) an erasure state associated with the respective block of data, the system comprising: a computing device; and a verification interface of the computing device, wherein: the verification interface of the computing device is configured to retrieve a first metadata portion associated with a first block of data included in the plurality of blocks of data; the verification interface of the computing device is configured to determine a current content classification associated with the first block of data, wherein the determined current content classification is one of plurality of types of content classification including at least a first type of content classification and a second type of content classification; the verification interface of the computing device is configured to determine a current erasure state associated with the first block of data, wherein the determined current erasure state is one of a plurality of types of erasure states including at least a first type of erasure state and a second type of erasure state; and the verification interface of the computing device is configured to determine an erasure status associated with the first block of data based on the current content classification associated with the first block of data and the current erasure state associated with the first block of data.

BRIEF DESCRIPTION OF THE DRAWING FIGURES

The scope of the present disclosure is best understood from the following detailed description of exemplary embodiments when read in conjunction with the accompanying drawings. Included in the drawings are the following figures:

FIG. 3 illustrates an example block descriptor data structure in accordance with exemplary embodiments.

FIG. 4 illustrates an example determination block analysis chart in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Figure 1:
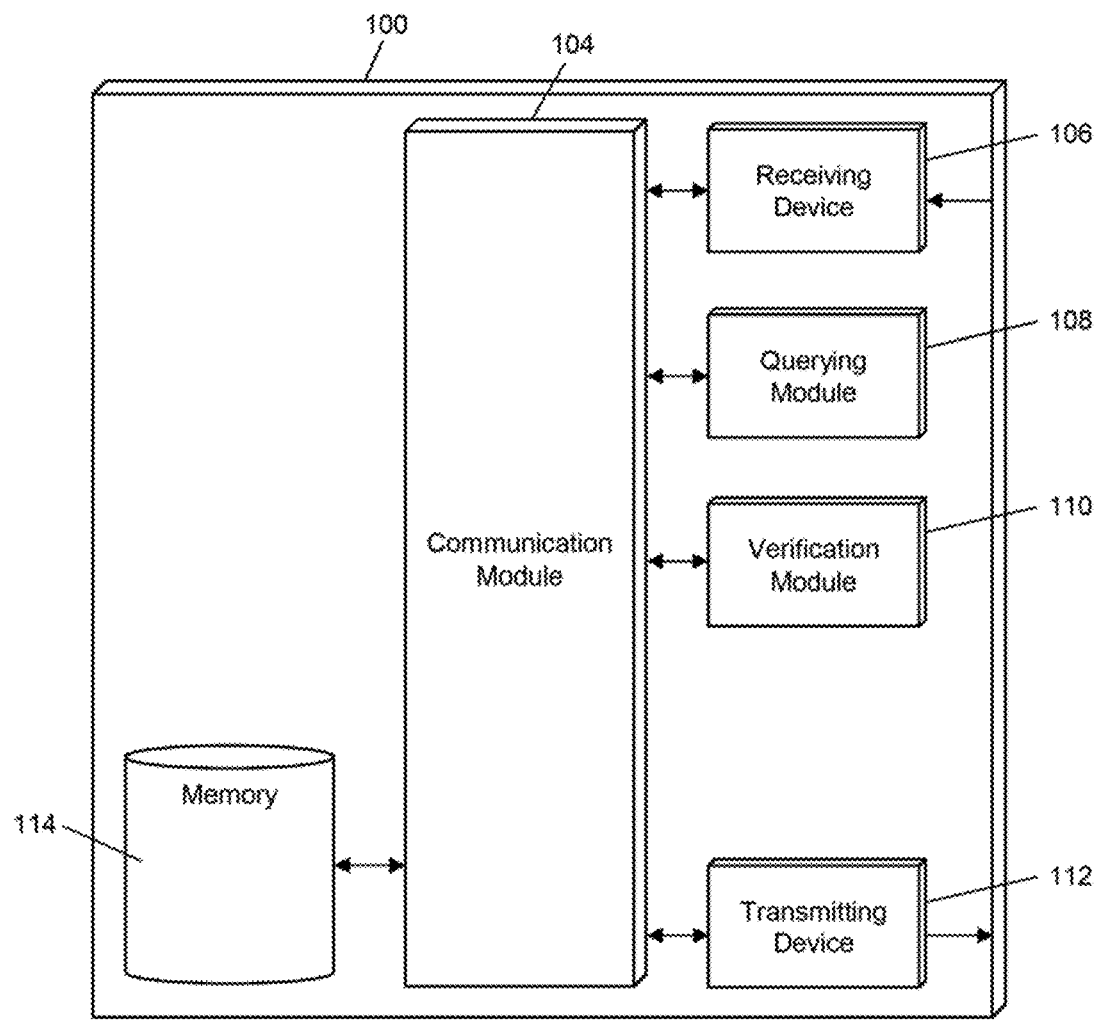
FIG. 1 is a block diagram illustrating a high level architecture of a computing device configured verifying erasure of data from a data storage device in accordance with exemplary embodiments.

FIG. 1 illustrates an embodiment of a computing device 100. It will be apparent to persons having skill in the relevant art that the embodiment of the computing device 100 illustrated in FIG. 1 is provided as illustration only and may not be exhaustive to all possible configurations of the computing device 100 suitable for performing the functions as discussed herein. For example, the computer system 700 illustrated in FIG. 7 and discussed in more detail below may be a suitable configuration of the computing device 100. The computing device 100 may be comprised of a plurality of modules, engines, devices, memories, and other components that are specially configured for the performing of the functions as discussed herein, including the verification of erasure of data from a data storage device 210 that may be included in a second computing device 200 or may be a standalone device 210.

The computing device 100 may include a receiving device 106. The receiving device 106 may be configured to receive data over one or more networks via one or more network protocols. In some instances, the receiving device 106 may be configured to receive data from other computing systems that may be located on a local network of the computing device 100 or external to the computing system via one or more communication methods, such as radio frequency, local area networks, wireless area networks, cellular communication networks, Bluetooth, the Internet, etc. In some embodiments, the receiving device 106 may be comprised of multiple devices, such as different receiving devices for receiving data over different networks, such as a first receiving device for receiving data over a local area network and a second receiving device for receiving data via the Internet. The receiving device 106 may receive electronically transmitted data signals, where data may be superimposed or otherwise encoded on the data signal and decoded, parsed, read, or otherwise obtained via receipt of the data signal by the receiving device 106. In some instances, the receiving device 106 may include a parsing module for parsing the received data signal to obtain the data superimposed thereon. For example, the receiving device 106 may include a parser program configured to receive and transform the received data signal into usable input for the functions performed by the processing device to carry out the methods and systems described herein.

The computing device 100 may also include a transmitting device 112. The transmitting device 112 may be configured to transmit data over one or more networks via one or more network protocols. In some instances, the transmitting device 112 may be configured to transmit data to computing systems that may be located on a local network of the computing device 100 or external to the computing system via one or more communication methods, local area networks, wireless area networks, cellular communication, Bluetooth, radio frequency, the Internet, etc. In some embodiments, the transmitting device 112 may be comprised of multiple devices, such as different transmitting devices for transmitting data over different networks, such as a first transmitting device for transmitting data over a local area network and a second transmitting device for transmitting data via the Internet. The transmitting device 112 may electronically transmit data signals that have data superimposed that may be parsed by a receiving computing device. In some instances, the transmitting device 112 may include one or more modules for superimposing, encoding, or otherwise formatting data into data signals suitable for transmission.

The computing device 100 may also include a communication module 104. The communication module 104 may be configured to transmit data between modules, engines, databases, memories, and other components of the computing device 100 (e.g., which may also be referred to as "devices" or "host devices" of the computing device 100) for use in performing the functions discussed herein. The communication module 104 may be comprised of one or more communication types and utilize various communication methods for communications within a computing device. For example, the communication module 104 may be comprised of a bus, contact pin connectors, wires, etc. In some embodiments, the communication module 104 may also be configured to communicate between internal components of the computing device 100 and external components of the computing device 100, such as externally connected databases, display devices, input devices, etc. The computing device 100 may also include a processing device. The processing device may be configured to perform the functions of the computing device 100 discussed herein as will be apparent to persons having skill in the relevant art. In some embodiments, the processing device may include and/or be comprised of a plurality of engines and/or modules specially configured to perform one or more functions of the processing device. As used herein, the term "module" may be software or hardware particularly programmed to receive an input, perform one or more processes using the input, and provides an output. The input, output, and processes performed by various modules will be apparent to one skilled in the art based upon the present disclosure.

For instance, the computing device 100 may include a querying module 108. The querying module 108 may be configured to execute queries on the data storage device 106 or other memories or data storage in or otherwise accessible by the computing device 100, such as related to data storage access. For instance, the querying module 108 may be a module utilized by host controllers for the executing of data commands related to storage namespaces in the data storage device 106 and other memories of the computing device 100. In another example, the querying module 108 may be configured to execute queries to the verification module 110 (discussed below) to initiate the verification of data erasure of a data storage device. For instance, when a user enters a command to initiate the verification of data erasure of a data storage device, the querying module 108 may communicate with the verification module 110 responsive to the executed requested command (e.g., received from a user and the like).

The computing device 100 may include a verification module 110. The verification module 110 may be configured to perform erasure verifications of a data storage device, such as data storage device 210 of the computing device 200 (discussed below). For instance, when the querying module 108 communicates with the verification module 110 to initiate a verification process, the verification module 110 may determine (e.g., via the transmitting device 112 and/or receiving device 106) an erasure status for data contained on the data storage device 210 based on information retrieved from metadata stored on the data storage device 210.

The computing device 100 may include a memory 114. The memory 114 may be a data storage device that may be read-only, random access, or other type of memory that may be used by the computing device 100 in the execution and use of the OS application. In some cases, a host controller may be configured to operate as the host controller of the memory 114 as well, or may be otherwise configured to monitor access to and usage of data stored in the memory 114. The memory 114 may be configured to store data for use by the computing device 100 in performing functions discussed herein. The memory 114, as well as the data storage device, may be configured to store data using suitable data formatting methods and schema and may be any suitable type of memory. The memory 114 may include, for example, encryption keys and algorithms, communication protocols and standards, data formatting standards and protocols, program code for modules and application programs of the processing device, and other data that may be suitable for use by the computing device 100 in the performance of the functions disclosed herein as will be apparent to persons having skill in the relevant art. In some embodiments, the memory 114 may be comprised of or may otherwise include a relational database that utilizes structured query language for the storage, identification, modifying, updating, accessing, etc. of structured data sets stored therein. In some instances, the memory 114 may be external to the computing device 100, such as part of a remote computing system that is external to, but in communication with, the computing device 100.

Figure 2:
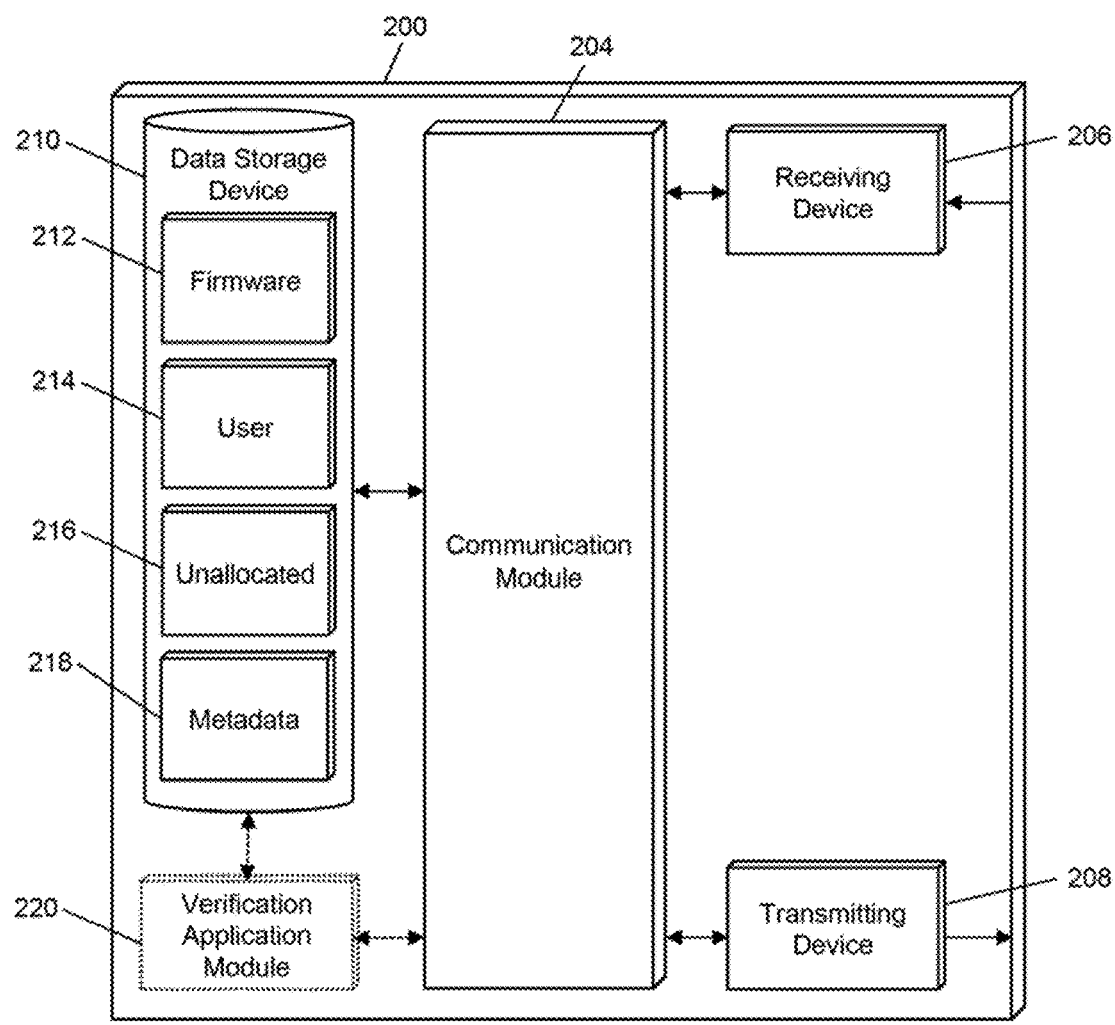
FIG. 2 is a block diagram illustrating a high level architecture of a computing device having a data storage device in accordance with exemplary embodiments.

FIG. 2 illustrates an embodiment of a computing device 200. It will be apparent to persons having skill in the relevant art that the embodiment of the computing device 200 illustrated in FIG. 2 is provided as illustration only and may not be exhaustive to all possible configurations of the computing device 200 suitable for performing the functions as discussed herein. For example, the computer system 700 illustrated in FIG. 7 and discussed in more detail below may be a suitable configuration of the computing device 200.

The computing device 200 may include a receiving device 206. The receiving device 106 may be configured to receive data over one or more networks via one or more network protocols. In some instances, the receiving device 206 may be configured to receive data from other computing systems that may be located on a local network of the computing device 200 or external to the computing system via one or more communication methods, such as radio frequency, local area networks, wireless area networks, cellular communication networks, Bluetooth, the Internet, etc. In some embodiments, the receiving device 206 may be comprised of multiple devices, such as different receiving devices for receiving data over different networks, such as a first receiving device for receiving data over a local area network and a second receiving device for receiving data via the Internet. The receiving device 206 may receive electronically transmitted data signals, where data may be superimposed or otherwise encoded on the data signal and decoded, parsed, read, or otherwise obtained via receipt of the data signal by the receiving device 206. In some instances, the receiving device 206 may include a parsing module for parsing the received data signal to obtain the data superimposed thereon. For example, the receiving device 206 may include a parser program configured to receive and transform the received data signal into usable input for the functions performed by the processing device to carry out the methods and systems described herein.

The computing device 200 may also include a transmitting device 208. The transmitting device 208 may be configured to transmit data over one or more networks via one or more network protocols. In some instances, the transmitting device 208 may be configured to transmit data to computing systems that may be located on a local network of the computing device 200 or external to the computing system via one or more communication methods, local area networks, wireless area networks, cellular communication, Bluetooth, radio frequency, the Internet, etc. In some embodiments, the transmitting device 208 may be comprised of multiple devices, such as different transmitting devices for transmitting data over different networks, such as a first transmitting device for transmitting data over a local area network and a second transmitting device for transmitting data via the Internet. The transmitting device 208 may electronically transmit data signals that have data superimposed that may be parsed by a receiving computing device. In some instances, the transmitting device 208 may include one or more modules for superimposing, encoding, or otherwise formatting data into data signals suitable for transmission.

The computing device 200 may also include a communication module 204. The communication module 204 may be configured to transmit data between modules, engines, databases, memories, and other components of the computing device 200 (e.g., which may also be referred to as "devices" or "host devices" of the computing device 200) for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the computing device 200 and external components of the computing device 200, such as externally connected databases, display devices, input devices, etc. The computing device 200 may also include a processing device. The processing device may be configured to perform the functions of the computing device 200 discussed herein as will be apparent to persons having skill in the relevant art. In some embodiments, the processing device may include and/or be comprised of a plurality of engines and/or modules specially configured to perform one or more functions of the processing device. As used herein, the term "module" may be software or hardware particularly programmed to receive an input, perform one or more processes using the input, and provides an output. The input, output, and processes performed by various modules will be apparent to one skilled in the art based upon the present disclosure.

The computing device 200 may include a data storage device 210. The data storage device 210 may be any type of device suitable for the storage of data, including a hard disk drive, solid state drive, compact disc, digital video disc, magnetic tape, etc. The data storage device 210 may include a host controller or other application program that may be implemented in hardware, software, or a combination thereof in the data storage device 210 that is configured to read and write data in the data storage device 210. The host controller may be configured to perform any functions related to access and modification of data stored in the data storage device 210, including the prevention of access to one or more data files, sectors, or blocks in the data storage device 210, the locking of sectors or blocks from modification, the reading or writing of raw or processed data, etc. As discussed herein, actions performed in the computing device 200 with respect to data stored in the data storage device 210 may be executed by or in conjunction with the host controller. According to disclosed aspects, the data storage device 210 may be a standalone or separate device that may interact with device 100.

According to some aspects, the data storage device 210 may be organized into addressable sets of data. In some embodiments, the sets of data may be physically arranged, logically imposed, and/or some combination thereof. The sets of data may be in the form of or described as blocks of data, where each block of data may include one of a different type of data. For example, the blocks of data may be categorized into one or more possible classification types based on the current content of a respective block, and the metadata portion 218 may indicate the classification type.

For example, a block of data may be classified as a firmware block of data 212, and may currently contain information or data that may be used internally by the storage device 210 or by the computing device 200 for device operation. In some embodiments, a firmware block of data 212 may contain non-user generated information or data, and might not contain any user generated data.

In another example, a block of data may be classified as a user block of data 214, and may currently contain information that may have been generated by a user of the storage device 210.

In another example, a block of data may be classified as an unallocated block of data 216, and may be a currently non-active block of data in the storage device 210. For example, an unallocated block of data 216 may be a block of data that might not be currently included in the active set of blocks of data. In some embodiments, an unallocated block of data 216 may have previously contained firmware data or user data. In some cases, an unallocated block of data 216 might not have ever been allocated or contained data.

According to some aspects, the blocks of data in storage device 210 may be in one of a plurality of possible erasure states based on the presence of content (or lack thereof) in a respective block, which the metadata portion 218 may indicate the erasure state. For example, a block may be in an erased state if that block has not has yet to be programmed with data or yet to be programmed with data since a last erasure. In another case, a block may be in a non-erased or not erased state if that block is currently programmed with or includes data.

According to disclosed aspects, the device 100 may retrieve and/or inspect a metadata portion 218 included in the data storage device 210 to verify the erasure of data from the storage device 210. The metadata portion 218 may include, for each block of data in the data storage device 210, a description of a content classification based on current content associated with a respective block of data contained in the data storage device 210. The metadata portion 218 may include, for each block of data in the data storage device 210, may include a description of an erasure state associated with a respective block of data contained in the data storage device 210. The device 100 may access the metadata portion 210 to quickly retrieve metadata information to determine the erasure status of one or more of the individual storage blocks contained in the data storage device 210, including those blocks not currently accessible to a user (e.g., the firmware blocks 212 and/or unallocated blocks 216). Because the metadata 218 does not include any user data, there may be limited or no security concerns over unauthorized data access to verify erasure of data of the data storage device 210.

In some embodiments, the querying module 108 of device 100 may receive an input to initiate the verification of the erasure of data of the data storage device 210 of another device 200. The querying module 108 may communicate with the verification module 110 to initiate a verification process. In some cases, the verification module 110 may communicate with the transmitting device 112 to initiate communication with the device 200, such as through physical contact or wireless communication, such as via the receiving device 206 of the device 200. In some cases, the verification module 110 may initiate direct communication with the device 200 or with the data storage device 210 to verify the erasure of data of the data storage device 210.

The verification module 110 may retrieve information from the metadata portion 218 of one or more blocks of data that are included in the data storage device 210. In some cases, the verification module 110 may communicate with the receiving device 106 to retrieve and/or receive information from the metadata portion 218, such as via the transmitting device 208 of the device 200, such as through physical contact or wireless communication. In other cases, the verification module 110 may initiate direct communication with the device 200 or with the data storage device 210 to verify the erasure of data of the data storage device 210.

The verification module 110 may determine, based on the information from retrieved metadata portion 218, a current content classification associated with the one or more blocks of data contained in the data storage device 210. The determined current content classification may be one of plurality of types of content classification including at least a first type of content classification and a second type of content classification. In some cases, the content classification may include more than two types of content classification. For example, the type of content classifications for blocks may include any of the following: a firmware block 212 (e.g., a block of data having non-user-generated information that may be used internally by the storage device 210 or device 200 for device operation), a user block 214 (e.g., a block of data having user-generated information), or an unallocated block 216 (e.g., a non-active block of data).

The verification module 110 may determine, based on the information from the retrieved metadata portion 218, a current erasure state associated with the one or more blocks of data. The determined current erasure state may be one of a plurality of types of erasure states including at least a first type of erasure state and a second type of erasure state. For example, the erasure state may be one of an erased stated (e.g., a block of data that has yet to be programmed with data or with a block of data that yet to be programmed with data since a last erasure) or a non-erased state (e.g., a block of data that is programmed with data).

In some embodiments, the metadata portion 210 may be included in respective blocks, such as in each of the blocks 212, 214, 216, and may describe the content classification and/or state of a respective block 212, 214, 216. For example, the metadata portion 201 may be formatted as a byte of data that may include 8 bits of data, where the verification module 110 may analyze the bits of data included in the byte of data to determine the content classification and/or state of the corresponding block.

FIG. 3 illustrates a block diagram illustrating an example configuration of a block descriptor 300. As shown in FIG. 3, one or more of the bits of the block descriptor 300 may correspond to one of the plurality of types of content classification. For example, bit 6 may identify whether the corresponding block is an unallocated block 216, bit 5 may identify whether the corresponding block is a firmware block 212, and bit 4 may identify whether the corresponding block is a user block 214.

According to some aspects, a high value associated with a bit may indicate that the determined current content classification associated with a corresponding block of data is of the content classification associated that bit. For example, a high value for bit 6 may indicate that the block is an unallocated block 216. According to some aspects, a low value associated with a bit may indicate that the determined current content classification associated with a corresponding block of data is different from (or not the same as) the content classification associated with that bit. For example, a low value for bit 5 may indicate that the block is different from a firmware block 212 (or not a firmware block 212).

In some cases, the sign convention or value indication may be reversed, such that a low value for bit 6 may indicate that the block is an unallocated block, and a high value for bit 5 may indicate that the block is different from a firmware block 212 (or not a firmware block 212). According to some embodiments, a block is to be classified as only one of the types of content classifications and cannot be classified as more than one type.

As shown in FIG. 3, one or more of the bits of the block descriptor 300 may correspond to one of the plurality of types of erasure states. For example, bit 1 may identify whether the corresponding block is non-erased or not erased, and bit 0 may identify whether the corresponding block is erased.

According to some aspects, a high value associated with a bit may indicate that the determined current erasure state associated with a corresponding block of data is of the erasure state associated with that bit. For example, a high value for bit 1 may indicate that the block is not erased, while a high value for bit 0 may indicate that the block is erased. According to some aspects, a low value associated with a bit may indicate that the determined current erasure state associated with a corresponding block of data is different from (or not the same as) the erasure state associated with that bit. For example, a low value for bit 0 may indicate that the block is different from being erased (or not erased). According to some embodiments, a block is to be classified as only one of the types of erasure states and cannot be classified as more than one type of erasure state. In some cases, the sign convention or value indication may be reversed, such that a low value for bit 0 may indicate that the block is erased, and a high value for bit 1 may indicated that the block is different from being not erased (i.e., that the block is erased).

According to some aspects, as shown in FIG. 3, one or more of the bits included in the block descriptor 300 may be unused or not associated with the content classification or state of the block. These unused bits may be used for another purpose. In some embodiments, one or more of the other unused bits included in the block descriptor 300 shown in FIG. 3 may describe other and/or additional content classifications or erasure states. In some embodiments, there may be more or less than three content classification associated bits or more or less than two erasure state associated bits. In some embodiments other types or forms of block descriptors 300 may be used in accordance with disclosed aspects, such as being more than one byte or in some other format or table structure.

According to some aspects, the verification module 110 may retrieve or access the block descriptor data structure 300 (i.e., the byte of data of metadata 218) from the device storage device or from a block of data, and might not retrieve any other data or bytes of data from the device storage device or from that block of data. As stated above, this may prevent any security concerns over unauthorized data access of data stored in the data storage device 210. In addition, because the verification module 110 may avoid reading and accessing the additional data from the data blocks 212, 214, 216, the verification module 110 may verify the erasure status of the blocks 212, 214, 216 much faster than if the verification module 110 would read the rest of the data of each block of data.

For example, a block of data may be of a size of 512 to 4096 bytes for magnetic media (solid-state storage devices may be larger than this). Accordingly, the verification module 110 may read $\frac{1}{512}^{th}$ the amount of data (i.e., the one byte block descriptor data structure 300) to verify the erasure statute, which greatly shortens the verification process. In addition, because conventional verification methods read data from other parts of the blocks of data stored on a data storage device 210, these conventional verification methods would be prevented from providing a verification of erasure of firmware and/or unallocated blocks of data.

The verification module 110 may determine an erasure status associated with one or more of the blocks of data included in the data storage device 210 based on the retrieved information from the metadata portion 218. FIG. 4 illustrates an example determination block analysis chart 400, which illustrates example erasure states associated with content classifications and erasure states.

According to disclosed aspects, the verification module 110 may determine a verified erasure status for a block, which may mean that the erasure of a corresponding block of data is acceptable from a data security standpoint. For example, as shown in FIG. 4, the erasure status of a firmware block 212 may be verified even though the firmware block 212 is not determined to be in an erased state. This may be because the data storage device 210 (or device 200) may still need the data and information contained in the firmware block 212 for device operations. In another case, as shown in FIG. 4, the erasure status of a user block 212 or an unallocated block 216 may be verified after the verification module 110 determines that the erasure state for the corresponding block is erased, while the erasure status may be unverified or unacceptable after the verification module 110 determines that the erasure state for the user block 212 or unallocated block 216 is non-erased.

According to some aspects, information from the block descriptor 300 and/or from the determination block analysis chart 400 may be presented or output from the device 100 or from the device 200 (e.g., such as after device 100 provides this information back to the device 200). For example, this information may be displayed on a display associated with device 100 or device 200, or provided in some other way. In some other cases, the device 100 or device 200 may perform an action based on the erasure status, such as securing or initiating an erasure of one or more blocks of data that have an unaccepted erasure status, and the like.

In some embodiments, the device 100 may be a separate device from the device 200. In some other embodiments, components (software and/or hardware) and functions of the device 100 may be embodied in a verification application module 220 included in the device 200, as shown in FIG. 2. For example, the verification application module 220 may be a software and/or hardware implementation of the computing device 100. In these cases, the verification application module 220 may act to verification the erasure of data from the data storage device 210 in the same or similar manner as discussed above, below, and herein throughout with respect to device 100.

Figure 5:
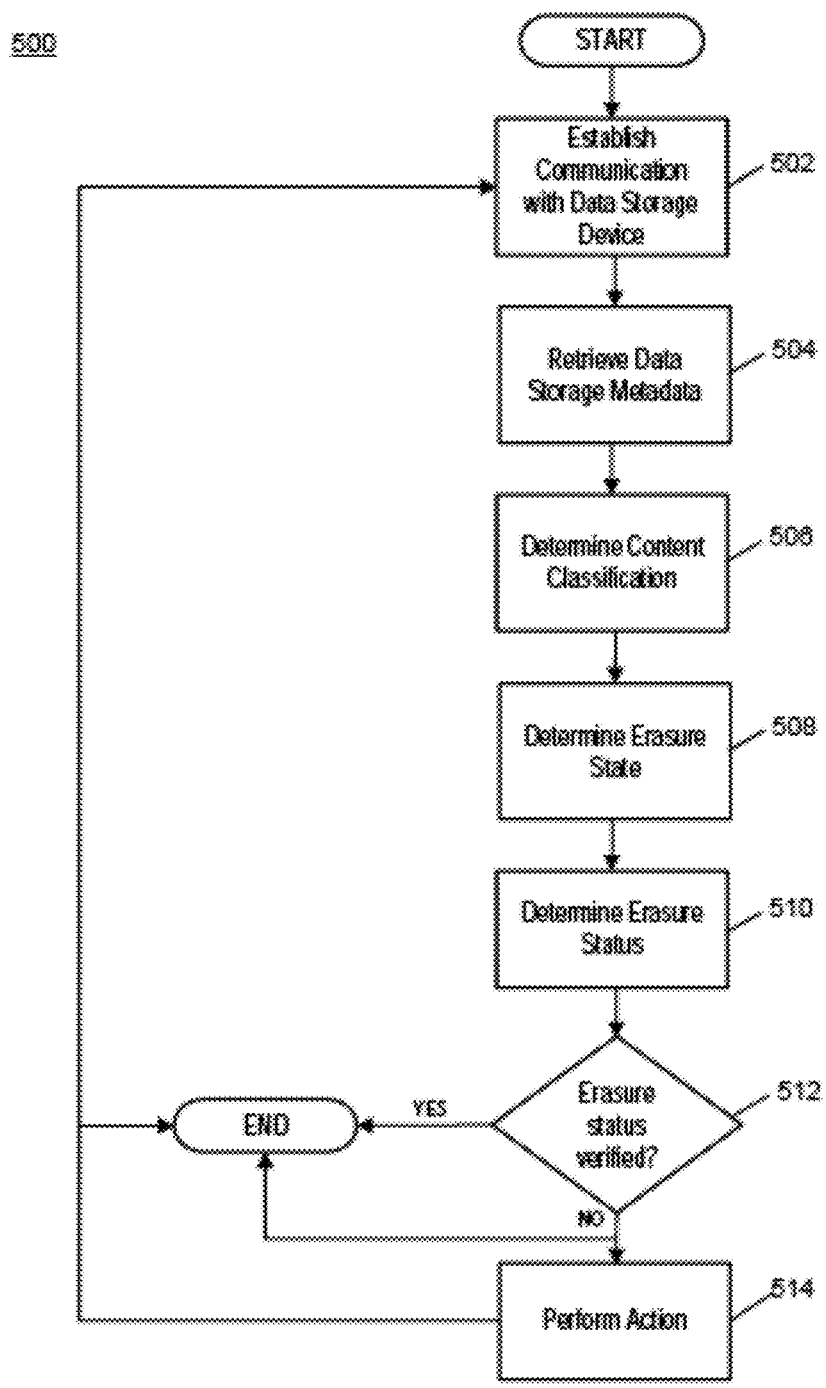
FIG. 5 is a flow diagram illustrating an exemplary process for verifying erasure of data from a data storage device in accordance with exemplary embodiments.

FIG. 5 illustrates an example flow diagram illustrating an exemplary process 500 for verifying erasure of data from the data storage device 210 in accordance with exemplary embodiments, such as performed by the verification module 110 or by verification application module 220.

Process 500 may begin at step 502. At step 502, the device 100 may establish communication with the data storage device 210 of the device 200. For example, the querying module 108 may receive an instruction (e.g., input from a user or other device) to verify the erasure of data of the data storage device 210. The querying module 108 may communicate with the verification module 110, and the verification module 110 may communicate (e.g., via the transmitting device 112) with the receiving device 206 of the device 200 to retrieve information from the metadata portion 218.

At step 504, the verification module 110 may retrieve information from the metadata portion 218. The metadata portion 218 may be stored as a data structure or table, such as a block descriptor data structure 300. The metadata portion 218 may be stored on the data storage device 210, in a block of data in the data storage device 210, or in another location (e.g., in another area of device 200, and the like). The metadata portion 218 may describe (1) a content classification based on current content associated with a respective block of data and (2) an erasure state associated with the respective block of data. In some cases, the metadata potion 218 may be stored in each of plurality of blocks of data 212, 214, 216 included in the data storage device 210. For example, the block descriptor data structure 300 may be stored in a first byte of data in the first block, where the first byte of data may include eight bits of data. According to some aspects, the verification module 110 might only retrieve, access, or read the metadata portion 218 associated with a block of data. In some cases, the metadata portion 218 of one block of data of data storage device 210 may be retrieved and/or analyzed by the verification module 110. In other cases, the metadata portion(s) 218 of more than one block of data (or all of the blocks of data) of data storage device 210 may be retrieved and/or analyzed by the verification module 110.

According to some aspects, the verification module 110 may analyze a one or a plurality of the bits of data included in the byte of data corresponding to metadata 218. One or more of the analyzed bits of data may correspond to one of the plurality of types of content classification (e.g., firmware, user, or unallocated). One or more of the analyzed bits of data may correspond to a current erasure state (e.g., erased or non-erased). As described above, a high value (or in some embodiments, a low value) for a particular bit may indicate that the corresponding block is associated with that particular bit's corresponding content classification or erasure state, while a low value (or in some embodiments, a high value) for a particular bit may indicate that the corresponding block is different from that particular bit's corresponding content classification or erasure state.

At step 506, the verification module 110 may determine a content classification associated with a block of data based on the retrieved metadata 218, such as based on the block descriptor data structure 300. For example, the determined current content classification may be one of plurality of types of content classification including at least a first type of content classification and a second type of content classification. In some cases, there may be more than two types of content classification, such as three types or more. For example, and as described above, a block of data of the data storage device 210 may be classified as a firmware block 212 (e.g., having non-user-generated information that may be used internally by the storage device 210 or by the computing device 200 for device operation), as a user block 214 (e.g., a block of data having user-generated information), or as an unallocated block 216 (e.g., a non-active block of data).

At step 508, the verification module 110 may determine an erasure state associated with a block of data based on the retrieved metadata 218, such as based on the block descriptor data structure 300. For example, the determined current erasure state may be one of a plurality of types of erasure states including at least a first type of erasure state and a second type of erasure state. For example, and as described above, a block of data of the data storage device 210 may be determined to be erased (e.g., the block does not contain data besides the metadata 218) or non-erased (e.g., the block contains data besides the metadata 218).

At step 510, the verification module 110 may determine an erasure status associated with a block of data based on the current content classification associated with the block of data and/or the current erasure state associated with first block of data. According to some aspects, the erasure status may be determined to be verified, which may mean that the erasure of a corresponding block of data is acceptable from a data security standpoint. The erasure status may be determined to be unverified, which may mean that the erasure of a corresponding block of data is unacceptable from a data security standpoint.

For example, with respect to FIG. 4, the verification module 110 may determine that the erasure status is verified responsive to the current content classification associated with the block of data indicating a block of data having non-user-generated information that may be used internally by the storage device 210 or by the computing device 200 for device operation. The verification module 110 may determine that the erasure status is verified responsive to the current content classification associated with the block of data indicating a block of data having user-generated information or a non-active block of data, and the erasure state associated with the block of data indicating a first type of erasure state (e.g., erased). The verification module 110 may determine that the erasure status is unverified responsive to the current content classification associated with the block of data indicating a block of data having user-generated information or a non-active block of data and the erasure state associated with the block of data indicating the second type of erasure state (e.g., non-erased). In some cases, the verification module 110 may determine that the erasure status is verified responsive to the erasure state associated with the block of data indicating a block of data that has yet to be programmed with data or with a block of data that yet to be programmed with data since a last erasure.

At step 512, the verification module 110 may evaluate the erasure status of the analyzed block of data. If the erasure status is verified ("yes"), then the process 500 may end. If the erasure status is not verified ("no"), then process 500 may proceed to step 514. At step 514, the device 100 or the device 200 may perform an action. For example, the device 100 or device 200 may secure the block (or blocks) of data that have a non-verified erasure status, or may initiate an erasure of the one or more blocks of data that have a non-verified erasure status. In some embodiments, the verification module 110 may repeat one or more of the steps of process 500 to further evaluate and/or verify the erasure of data from the data storage device 210 (such as with respect to the unverified block of data). For example, as shown by the arrow from step 514 to step 502, the process 500 (or any portion thereof) may be repeated. In some cases, the process 500 may end after determining a non-verified erasure status of a block at step 512. In some cases, the process 500 may end after performing an action at step 514.

Figure 6:
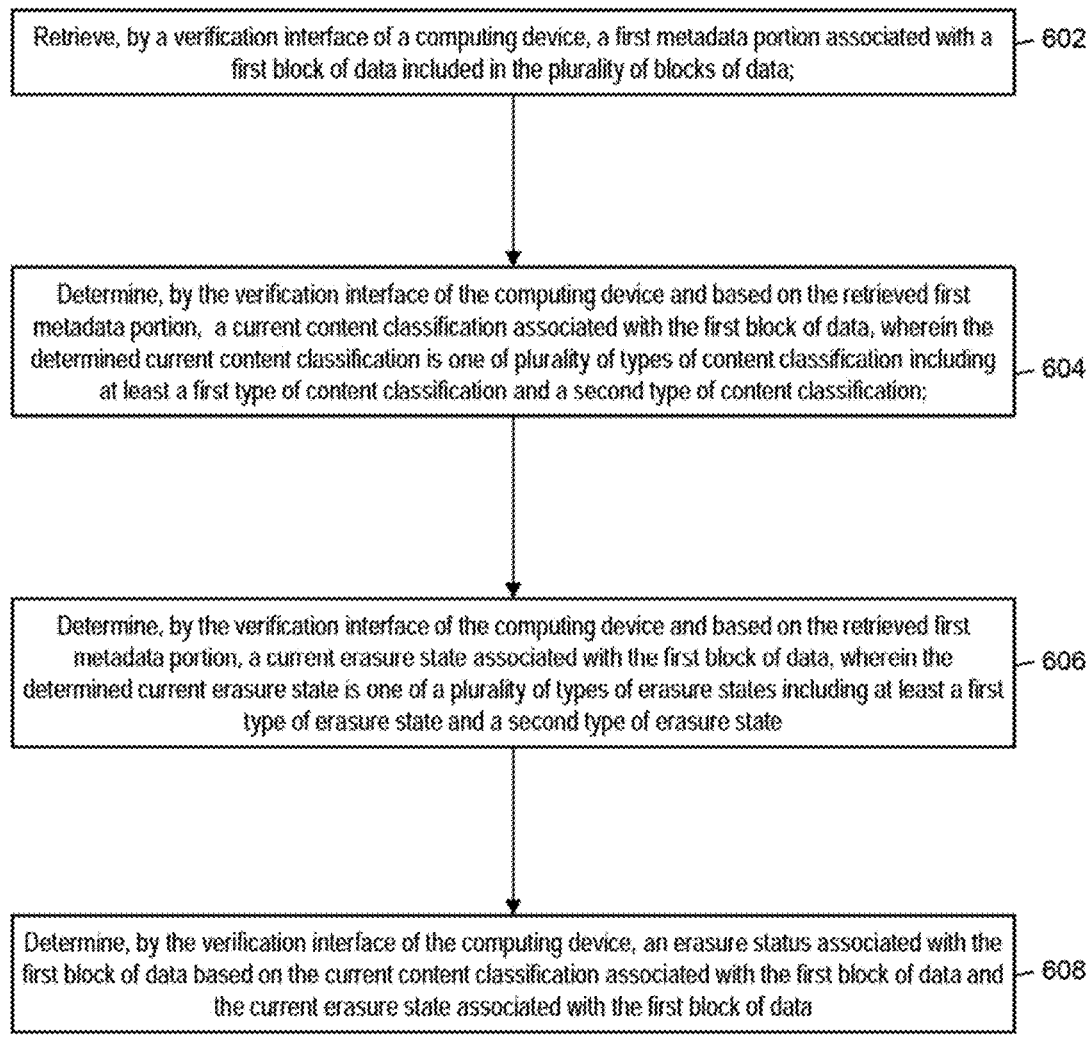
FIG. 6 is a flow diagram illustrating an exemplary process for verifying erasure of data from a data storage device in accordance with exemplary embodiments.

FIG. 6 illustrates an exemplary method of verifying erasure of data from a data storage device 210, such as performed by the verification module 110 or by verification application module 220. The data storage device 210 may include a plurality of blocks of data, where the data stored in the data storage device includes a metadata portion (e.g., metadata portion 218) describing (1) a content classification based on current content associated with a respective block of data and (2) an erasure state associated with the respective block of data. In some embodiments, each of the plurality of blocks of data included in the data storage device 210 may include a metadata portion (e.g., metadata portion 218).

At step 602, a verification module 110 may retrieve a first metadata portion associated with a first block of data included in the plurality of blocks of data in accordance with disclosed aspects.

At step 604, the verification module 110 may determine, based on the retrieved first metadata portion, a current content classification associated with the first block of data, where the determined current content classification is one of plurality of types of content classification including at least a first type of content classification and a second type of content classification.

At step 606, the verification module 110 may determine, based on the retrieved first metadata portion, a current erasure state associated with the first block of data, where the determined current erasure state is one of a plurality of types of erasure states including at least a first type of erasure state and a second type of erasure state.

At step 608, the verification module 110 may determine an erasure status associated with the first block of data based on the current content classification associated with the first block of data and the current erasure state associated with the first block of data.

In some embodiments, with respect to FIG. 6, the retrieving step is performed for each of the plurality of blocks of data and the determining steps are performed for each of the plurality of blocks of data. In some cases, an action may be performed based on the determined erasure status, such as further verifying erasure of an unverified block of data, securing the data of the unverified block of data, or erasing the data of the unverified block of data.

Computer System Architecture

Figure 7:
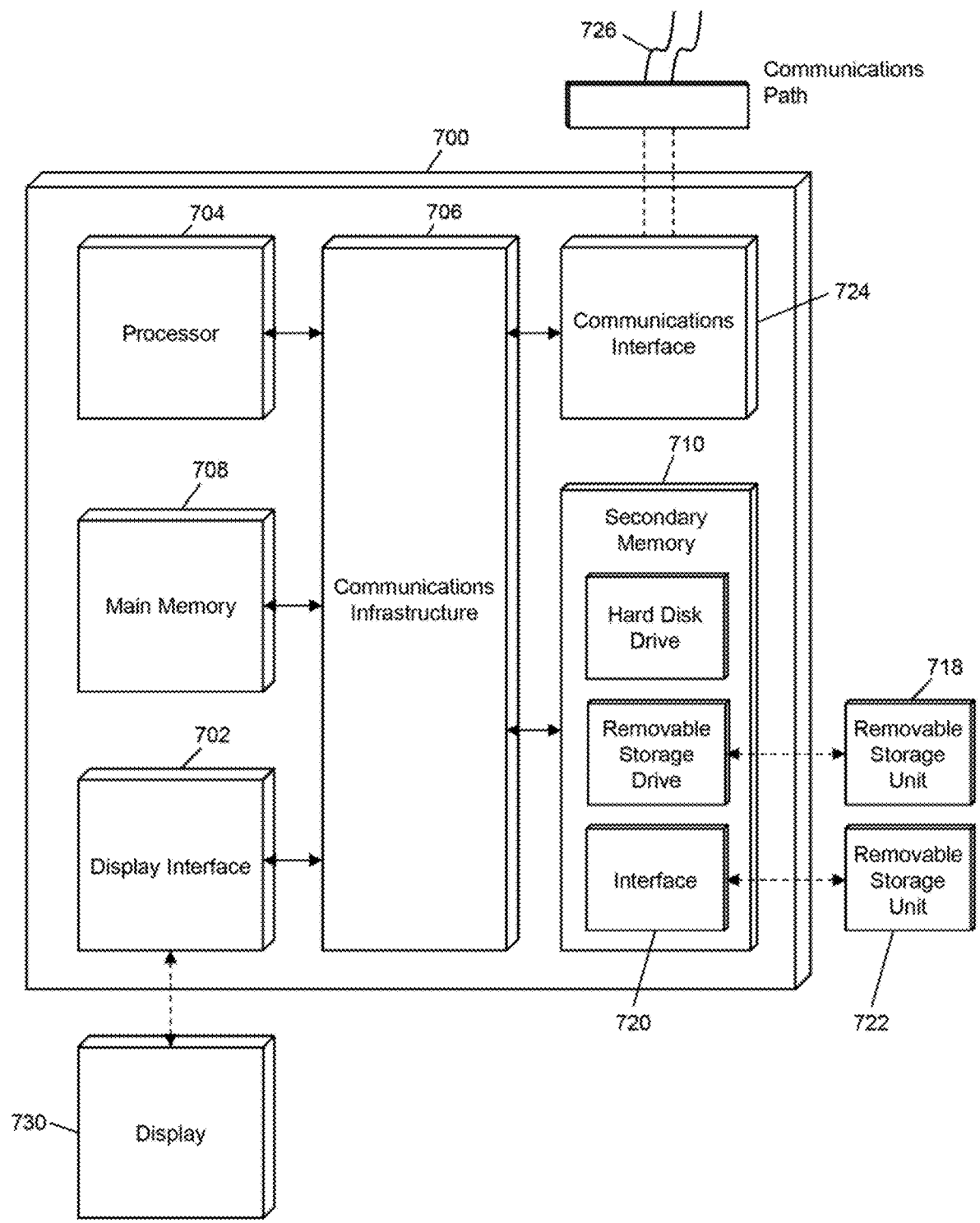
FIG. 7 is a block diagram illustrating a computer system architecture in accordance with exemplary embodiments.

FIG. 7 illustrates a computer system 700 in which embodiments of the present disclosure, or portions thereof, may be implemented as computer-readable code. For example, the computing device 100 of FIG. 1 and/or the computing device 200 of FIG. 2 may be implemented in the computer system 700 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 5 and 6.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 718, a removable storage unit 722, and a hard disk installed in hard disk drive 712.

Various embodiments of the present disclosure are described in terms of this example computer system 700. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 704 may be a special purpose or a general purpose processor device specifically configured to perform the functions discussed herein. The processor device 704 may be connected to a communications infrastructure 706, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 700 may also include a main memory 708 (e.g., random access memory, read-only memory, etc.), and may also include a secondary memory 710. The secondary memory 710 may include the hard disk drive 712 and a removable storage drive 714, such as a floppy disk drive, a magnetic tape drive, an optical disk drive, a flash memory, etc.

The removable storage drive 714 may read from and/or write to the removable storage unit 718 in a well-known manner. The removable storage unit 718 may include a removable storage media that may be read by and written to by the removable storage drive 714. For example, if the removable storage drive 714 is a floppy disk drive or universal serial bus port, the removable storage unit 718 may be a floppy disk or portable flash drive, respectively. In one embodiment, the removable storage unit 718 may be non-transitory computer readable recording media.

In some embodiments, the secondary memory 710 may include alternative means for allowing computer programs or other instructions to be loaded into the computer system 700, for example, the removable storage unit 722 and an interface 720. Examples of such means may include a program cartridge and cartridge interface (e.g., as found in video game systems), a removable memory chip (e.g., EEPROM, PROM, etc.) and associated socket, and other removable storage units 722 and interfaces 720 as will be apparent to persons having skill in the relevant art.

Data stored in the computer system 700 (e.g., in the main memory 708 and/or the secondary memory 710) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 700 may also include a communications interface 724. The communications interface 724 may be configured to allow software and data to be transferred between the computer system 700 and external devices. Exemplary communications interfaces 724 may include a modem, a network interface (e.g., an Ethernet card), a communications port, a PCMCIA slot and card, etc. Software and data transferred via the communications interface 424 may be in the form of signals, which may be electronic, electromagnetic, optical, or other signals as will be apparent to persons having skill in the relevant art. The signals may travel via a communications path 726, which may be configured to carry the signals and may be implemented using wire, cable, fiber optics, a phone line, a cellular phone link, a radio frequency link, etc.

The computer system 700 may further include a display interface 702. The display interface 702 may be configured to allow data to be transferred between the computer system 700 and external display 730. Exemplary display interfaces 702 may include high-definition multimedia interface (HDMI), digital visual interface (DVI), video graphics array (VGA), etc. The display 730 may be any suitable type of display for displaying data transmitted via the display interface 702 of the computer system 700, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 708 and secondary memory 710, which may be memory semiconductors (e.g., DRAMs, etc.). These computer program products may be means for providing software to the computer system 700. Computer programs (e.g., computer control logic) may be stored in the main memory 708 and/or the secondary memory 710. Computer programs may also be received via the communications interface 724. Such computer programs, when executed, may enable computer system 700 to implement the present methods as discussed herein. In particular, the computer programs, when executed, may enable processor device 704 to implement the methods illustrated by FIGS. 5 and 6, as discussed herein. Accordingly, such computer programs may represent controllers of the computer system 700. Where the present disclosure is implemented using software, the software may be stored in a computer program product and loaded into the computer system 700 using the removable storage drive 714, interface 720, and hard disk drive 712, or communications interface 724.

The processor device 704 may comprise one or more modules or engines configured to perform the functions of the computer system 700. Each of the modules or engines may be implemented using hardware and, in some instances, may also utilize software, such as corresponding to program code and/or programs stored in the main memory 708 or secondary memory 710. In such instances, program code may be compiled by the processor device 704 (e.g., by a compiling module or engine) prior to execution by the hardware of the computer system 700. For example, the program code may be source code written in a programming language that is translated into a lower level language, such as assembly language or machine code, for execution by the processor device 704 and/or any additional hardware components of the computer system 700. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 700 to perform the functions disclosed herein. It will be apparent to persons having skill in the relevant art that such processes result in the computer system 700 being a specially configured computer system 700 uniquely programmed to perform the functions discussed above.

Techniques consistent with the present disclosure provide, among other features, systems and methods for the monitoring and control of data access. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method of verifying erasure of data from a data storage device, wherein the data stored in the data storage device comprises a plurality of blocks of data, wherein the data stored in the data storage device comprises a metadata portion describing (1) a content classification based on current content associated with a respective block of data and (2) an erasure state associated with the respective block of data, the method comprising:

retrieving, by a verification interface of a computing device, a first metadata portion associated with a first block of data included in the plurality of blocks of data;

determining, by the verification interface of the computing device and based on the retrieved first metadata portion, a current content classification associated with the first block of data, wherein the determined current content classification is one of plurality of types of content classification including at least a first type of content classification and a second type of content classification, and wherein the first type of content classification and the second type of content classification are each associated with a different one of the following: a block of data having non-user-generated information that is used internally for device operation, a block of data having user-generated information, or a non-active block of data;

determining, by the verification interface of the computing device and based on the retrieved first metadata portion, a current erasure state associated with the first block of data, wherein the determined current erasure state is one of a plurality of types of erasure states including at least a first type of erasure state and a second type of erasure state; and determining, by the verification interface of the computing device, an erasure status associated with the first block of data based on the current content classification associated with the first block of data and the current erasure state associated with the first block of data.

2. The method of claim 1, wherein the first metadata portion is stored in a block descriptor data structure included in the first block.

3. The method of claim 2, wherein the block descriptor data structure is stored in a first byte of data in the first block, the first byte of data comprising eight bits of data, wherein the first byte of data is retrieved by the verification interface and no other bytes of data of the first data block are retrieved by the verification interface.

4. The method of claim 3, wherein the current content classification of the first block is determined by analyzing a plurality of the bits of data included in the byte of data in the first block, wherein each of the analyzed bits of data correspond to one of the plurality of types of content classification.

5. The method of claim 4, wherein:
one of a high value or a low value is associated with a first one of the analyzed bits that indicates the determined current content classification associated with the first block of data is of the content classification associated the first one of the analyzed bits, and
the other one of the high value or the low value is associated with a second one of the analyzed bits that indicates that the current content classification associated the first block of data is different from the content classification associated with the second one of the analyzed bits.

6. The method of claim 3, wherein the current erasure state of the first block is determined by analyzing a plurality of the bits of data included in the byte of data in the first block, wherein each of the analyzed bits of data correspond to one of the plurality of types of erasure states.

7. The method of claim 6, wherein:
one of a high value or a low value is associated with a first one of the analyzed bits that indicates the determined current erasure state associated with the first block of data is of the erasure state associated the first one of the analyzed bits, and
the other one of the high value or the low value is associated with a second one of the analyzed bits that indicates that the current erasure state associated the first block of data is different from the erasure state associated with the second one of the analyzed bits.

8. The method of claim 1, wherein the determined erasure status associated with the first block of data is determined according to the following:
responsive to the current content classification associated with the first block of data indicating a block of data having non-user-generated information that is used internally by the storage device for device operation, the erasure state is determined to be verified,
responsive to the current content classification associated with the first block of data indicating a block of data having user-generated information or a non-active block of data, and the erasure state associated with the first block of data indicating the first type of erasure state, the erasure state is determined to be verified, and
responsive to the current content classification associated with the first block of data indicating a block of data having user-generated information or a non-active block of data, and the erasure state associated with the first block of data indicating the second type of erasure state, the erasure state is determined to be unverified.

9. The method of claim 1, wherein the determined current content classification is one of plurality of types of content classification including at least a first type of content classification, a second type of content classification, and a third type of content classification.

10. The method of claim 9, wherein:
the first type of content classification is associated with non-user-generated information that is used internally for device operation,
the second type of content classification is associated with user-generated information, and
the third type of content classification is associated with a non-active block of data.

11. The method of claim 1, wherein:
the first type of erasure state is associated with a block of data that has yet to be programmed with data or with a block of data that yet to be programmed with data since a last erasure, and
the second type of erasure state is associated with a block of data that is programmed with data.

12. The method of claim 11, wherein the determined erasure status associated with the first block of data is determined according to the following:
responsive to the erasure state associated with the first block of data indicating a block of data that has yet to be programmed with data or with a block of data that yet to be programmed with data since a last erasure, the erasure state is determined to be verified,
responsive to the current content classification associated with the first block of data indicating a block of data having user-generated information or a non-active block of data, and the erasure state associated with the first block of data indicating the first type of erasure state, the erasure state is determined to be verified, and
responsive to the current content classification associated with the first block of data indicating a block of data having user-generated information or a non-active block of data, and the erasure state associated with the first block of data indicating the second type of erasure state, the erasure state is determined to be unverified.

13. The method of claim 1, wherein the retrieving step is performed for each of the plurality of blocks of data and the determining steps are performed for each of the plurality of blocks of data.

14. A system for verifying erasure of data from a data storage device, wherein the data stored in the data storage device comprises a plurality of blocks of data, wherein the data stored in the data storage device comprises a metadata portion describing (1) a content classification based on current content associated with a respective block of data and (2) an erasure state associated with the respective block of data, the system comprising:

a computing device; and a verification interface of the computing device, wherein:
the verification interface of the computing device is configured to retrieve a first metadata portion associated with a first block of data included in the plurality of blocks of data;

the verification interface of the computing device is configured to determine a current content classification associated with the first block of data, wherein the determined current content classification is one of plurality of types of content classification including at least a first type of content classification and a second type of content classification, and wherein the first type of content classification and the second type of content classification are each associated with a different one of the following: a block of data having non-user-generated information that is used internally for device operation, a block of data having user-generated information, or a non-active block of data;

the verification interface of the computing device is configured to determine a current erasure state associated with the first block of data, wherein the determined current erasure state is one of a plurality of types of erasure states including at least a first type of erasure state and a second type of erasure state; and the verification interface of the computing device is configured to determine an erasure status associated with the first block of data based on the current content classification associated with the first block of data and the current erasure state associated with the first block of data.

15. The system of claim 14, wherein the first metadata portion is stored in a block descriptor data structure included in the first block.

16. The system of claim 15, wherein the block descriptor data structure is stored in a first byte of data in the first block, the first byte of data comprising eight bits of data, wherein the first byte of data is retrieved by the verification interface and no other bytes of data of the first data block are retrieved by the verification interface.

17. The system of claim 16, wherein the current content classification of the first block is determined by analyzing a plurality of the bits of data included in the byte of data in the first block, wherein each of the analyzed bits of data correspond to one of the plurality of types of content classification.

18. The system of claim 17, wherein:
one of a high value or a low value is associated with a first one of the analyzed bits that indicates the determined current content classification associated with the first block of data is of the content classification associated the first one of the analyzed bits, and
the other one of the high value or the low value is associated with a second one of the analyzed bits that indicates that the current content classification associated the first block of data is different from the content classification associated with the second one of the analyzed bits.

19. The system of claim 16, wherein the current erasure state of the first block is determined by analyzing a plurality of the bits of data included in the byte of data in the first block, wherein each of the analyzed bits of data correspond to one of the plurality of types of erasure states.

20. The system of claim 19, wherein:
one of a high value or a low value is associated with a first one of the analyzed bits that indicates the determined current erasure state associated with the first block of data is of the erasure state associated the first one of the analyzed bits, and
the other one of the high value or the low value is associated with a second one of the analyzed bits that indicates that the current erasure state associated the first block of data is different from the erasure state associated with the second one of the analyzed bits.

21. The system of claim 14, wherein the determined erasure status associated with the first block of data is determined according to the following:
responsive to the current content classification associated with the first block of data indicating a block of data having non-user-generated information that is used internally by the storage device for device operation, the erasure state is determined to be verified,
responsive to the current content classification associated with the first block of data indicating a block of data having user-generated information or a non-active block of data, and the erasure state associated with the first block of data indicating the first type of erasure state, the erasure state is determined to be verified, and
responsive to the current content classification associated with the first block of data indicating a block of data having user-generated information or a non-active block of data, and the erasure state associated with the first block of data indicating the second type of erasure state, the erasure state is determined to be unverified.

22. The system of claim 14, wherein the determined current content classification is one of plurality of types of content classification including at least a first type of content classification, a second type of content classification, and a third type of content classification.

23. The system of claim 22, wherein:
the first type of content classification is associated with non-user-generated information that is used internally for device operation,
the second type of content classification is associated with user-generated information, and
the third type of content classification is associated with a non-active block of data.

24. The system of claim 14, wherein:
the first type of erasure state is associated with a block of data that has yet to be programmed with data or with a block of data that yet to be programmed with data since a last erasure, and
the second type of erasure state is associated with a block of data that is programmed with data.

25. The system of claim 24, wherein the determined erasure status associated with the first block of data is determined according to the following:
responsive to the erasure state associated with the first block of data indicating a block of data that has yet to be programmed with data or with a block of data that yet to be programmed with data since a last erasure, the erasure state is determined to be verified,
responsive to the current content classification associated with the first block of data indicating a block of data having user-generated information or a non-active block of data, and the erasure state associated with the first block of data indicating the first type of erasure state, the erasure state is determined to be verified, and
responsive to the current content classification associated with the first block of data indicating a block of data having user-generated information or a non-active block of data, and the erasure state associated with the first block of data indicating the second type of erasure state, the erasure state is determined to be unverified.

26. The system of claim 14, wherein the retrieving step is performed for each of the plurality of blocks of data and the determining steps are performed for each of the plurality of blocks of data.

27. A method of verifying erasure of data from a data storage device, wherein the data stored in the data storage device comprises a plurality of blocks of data, wherein the data stored in the data storage device comprises a metadata portion describing (1) a content classification based on current content associated with a respective block of data and (2) an erasure state associated with the respective block of data, the method comprising:
   retrieving, by a verification interface of a computing device, a first metadata portion associated with a first block of data included in the plurality of blocks of data, wherein the first metadata portion is stored in a block descriptor data structure included in the first block and the block descriptor data structure is stored in a first byte of data in the first block, the first byte of data comprising eight bits of data, wherein the first byte of data is retrieved by the verification interface and no other bytes of data of the first data block are retrieved by the verification interface;
   determining, by the verification interface of the computing device and based on the retrieved first metadata portion, a current content classification associated with the first block of data, wherein the determined current content classification is one of plurality of types of content classification including at least a first type of content classification and a second type of content classification;
   determining, by the verification interface of the computing device and based on the retrieved first metadata portion, a current erasure state associated with the first block of data, wherein the determined current erasure state is one of a plurality of types of erasure states including at least a first type of erasure state and a second type of erasure state; and
   determining, by the verification interface of the computing device, an erasure status associated with the first block of data based on the current content classification associated with the first block of data and the current erasure state associated with the first block of data.

28. A method of verifying erasure of data from a data storage device, wherein the data stored in the data storage device comprises a plurality of blocks of data, wherein the data stored in the data storage device comprises a metadata portion describing (1) a content classification based on current content associated with a respective block of data and (2) an erasure state associated with the respective block of data, the method comprising:
   retrieving, by a verification interface of a computing device, a first metadata portion associated with a first block of data included in the plurality of blocks of data;
   determining, by the verification interface of the computing device and based on the retrieved first metadata portion, a current content classification associated with the first block of data, wherein the determined current content classification is one of plurality of types of content classification including at least a first type of content classification and a second type of content classification, and a third type of content classification, and wherein the first type of content classification is associated with non-user-generated information that is used internally for device operation, the second type of content classification is associated with user-generated information, and the third type of content classification is associated with a non-active block of data;
   determining, by the verification interface of the computing device and based on the retrieved first metadata portion, a current erasure state associated with the first block of data, wherein the determined current erasure state is one of a plurality of types of erasure states including at least a first type of erasure state and a second type of erasure state; and
   determining, by the verification interface of the computing device, an erasure status associated with the first block of data based on the current content classification associated with the first block of data and the current erasure state associated with the first block of data.

29. A method of verifying erasure of data from a data storage device, wherein the data stored in the data storage device comprises a plurality of blocks of data, wherein the data stored in the data storage device comprises a metadata portion describing (1) a content classification based on current content associated with a respective block of data and (2) an erasure state associated with the respective block of data, the method comprising:
   retrieving, by a verification interface of a computing device, a first metadata portion associated with a first block of data included in the plurality of blocks of data;
   determining, by the verification interface of the computing device and based on the retrieved first metadata portion, a current content classification associated with the first block of data, wherein the determined current content classification is one of plurality of types of content classification including at least a first type of content classification and a second type of content classification;
   determining, by the verification interface of the computing device and based on the retrieved first metadata portion, a current erasure state associated with the first block of data, wherein the determined current erasure state is one of a plurality of types of erasure states including at least a first type of erasure state and a second type of erasure state; and
   determining, by the verification interface of the computing device, an erasure status associated with the first block of data based on the current content classification associated with the first block of data and the current erasure state associated with the first block of data; and
   wherein: the first type of erasure state is associated with a block of data that has yet to be programmed with data or with a block of data that yet to be programmed with data since a last erasure, and the second type of erasure state is associated with a block of data that is programmed with data; and
   wherein the determined erasure status associated with the first block of data is determined according to the following:
      responsive to the erasure state associated with the first block of data indicating a block of data that has yet to be programmed with data or with a block of data that yet to be programmed with data since a last erasure, the erasure state is determined to be verified,
      responsive to the current content classification associated with the first block of data indicating a block of data having user-generated information or a non-active block of data, and the erasure state associated with the first block of data indicating the first type of erasure state, the erasure state is determined to be verified, and responsive to the current content classification associated with the first block of data indicating a block of data having user-generated information or a non-active block of data, and the erasure state associated with the first block of data indicating the second type of erasure state, the erasure state is determined to be unverified.

30. A system for verifying erasure of data from a data storage device, wherein the data stored in the data storage device comprises a plurality of blocks of data, wherein the data stored in the data storage device comprises a metadata portion describing (1) a content classification based on current content associated with a respective block of data and (2) an erasure state associated with the respective block of data, the system comprising:

a computing device; and a verification interface of the computing device, wherein:

the verification interface of the computing device is configured to retrieve a first metadata portion associated with and stored in a block descriptor data structure included in a first block of data included in the plurality of blocks of data, the block descriptor data structure is stored in a first byte of data in the first block, the first byte of data comprising eight bits of data, wherein the first byte of data is retrieved by the verification interface and no other bytes of data of the first data block are retrieved by the verification interface;

the verification interface of the computing device is configured to determine a current content classification associated with the first block of data, wherein the determined current content classification is one of plurality of types of content classification including at least a first type of content classification and a second type of content classification;

the verification interface of the computing device is configured to determine a current erasure state associated with the first block of data, wherein the determined current erasure state is one of a plurality of types of erasure states including at least a first type of erasure state and a second type of erasure state; and the verification interface of the computing device is configured to determine an erasure status associated with the first block of data based on the current content classification associated with the first block of data and the current erasure state associated with the first block of data.

31. A system for verifying erasure of data from a data storage device, wherein the data stored in the data storage device comprises a plurality of blocks of data, wherein the data stored in the data storage device comprises a metadata portion describing (1) a content classification based on current content associated with a respective block of data and (2) an erasure state associated with the respective block of data, the system comprising:

a computing device; and a verification interface of the computing device, wherein:

the verification interface of the computing device is configured to retrieve a first metadata portion associated with a first block of data included in the plurality of blocks of data;

the verification interface of the computing device is configured to determine a current content classification associated with the first block of data, wherein the determined current content classification is one of plurality of types of content classification including at least a first type of content classification, a second type of content classification, and a third type of content classification, wherein the first type of content classification is associated with non-user-generated information that is used internally for device operation, the second type of content classification is associated with user-generated information, and the third type of content classification is associated with a non-active block of data;

the verification interface of the computing device is configured to determine a current erasure state associated with the first block of data, wherein the determined current erasure state is one of a plurality of types of erasure states including at least a first type of erasure state and a second type of erasure state; and the verification interface of the computing device is configured to determine an erasure status associated with the first block of data based on the current content classification associated with the first block of data and the current erasure state associated with the first block of data.

32. A system for verifying erasure of data from a data storage device, wherein the data stored in the data storage device comprises a plurality of blocks of data, wherein the data stored in the data storage device comprises a metadata portion describing (1) a content classification based on current content associated with a respective block of data and (2) an erasure state associated with the respective block of data, the system comprising:

a computing device; and a verification interface of the computing device, wherein:

the verification interface of the computing device is configured to retrieve a first metadata portion associated with a first block of data included in the plurality of blocks of data;

the verification interface of the computing device is configured to determine a current content classification associated with the first block of data, wherein the determined current content classification is one of plurality of types of content classification including at least a first type of content classification and a second type of content classification;

the verification interface of the computing device is configured to determine a current erasure state associated with the first block of data, wherein the determined current erasure state is one of a plurality of types of erasure states including at least a first type of erasure state and a second type of erasure state wherein the first type of erasure state is associated with a block of data that has yet to be programmed with data or with a block of data that yet to be programmed with data since a last erasure, and the second type of erasure state is associated with a block of data that is programmed with data; and the verification interface of the computing device is configured to determine an erasure status associated with the first block of data based on the current content classification associated with the first block of data and the current erasure state associated with the first block of data, wherein the determined erasure status associated with the first block of data is determined according to the following: responsive to the erasure state associated with the first block of data indicating a block of data that has yet to be programmed with data or with a block of data that yet to be programmed with data since a last erasure, the erasure state is determined to be verified, responsive to the current content classification associated with the first block of data indicating a block of data having user-generated information or a non-active block of data, and the erasure state associated with the first block of data indicating the first type of erasure state, the erasure state is determined to be verified, and responsive to the current content classification associated with the first block of data indicating a block of data having user-generated information or a non-active block of data, and the erasure state associated with the first block of data indicating the second type of erasure state, the erasure state is determined to be unverified.

\* \* \* \* \*

UNITED STATES PATENT AND TRADEMARK OFFICE
CERTIFICATE OF CORRECTION

PATENT NO. : 11,175,851 B2  
APPLICATION NO. : 16/684858  
DATED : November 16, 2021  
INVENTOR(S) : Tony Edward Fessel Page 1 of 1

It is certified that error appears in the above-identified patent and that said Letters Patent is hereby corrected as shown below:

On the Title Page

Item (73) "Assignee: CIGNET TECHNOLOGY, INC., Fort Myers, Florida" should read --Assignee: CIGENT TECHNOLOGY, INC., Fort Myers, Florida--

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*